Dec. 22, 1964   E. C. SWIFT   3,162,495
TABLE CONSTRUCTION
Filed June 26, 1961   2 Sheets-Sheet 1

INVENTOR.
EUGENE C. SWIFT
BY
*Leerman, Leerman & McCulloch*
ATTORNEYS

Dec. 22, 1964    E. C. SWIFT    3,162,495
TABLE CONSTRUCTION
Filed June 26, 1961    2 Sheets-Sheet 2
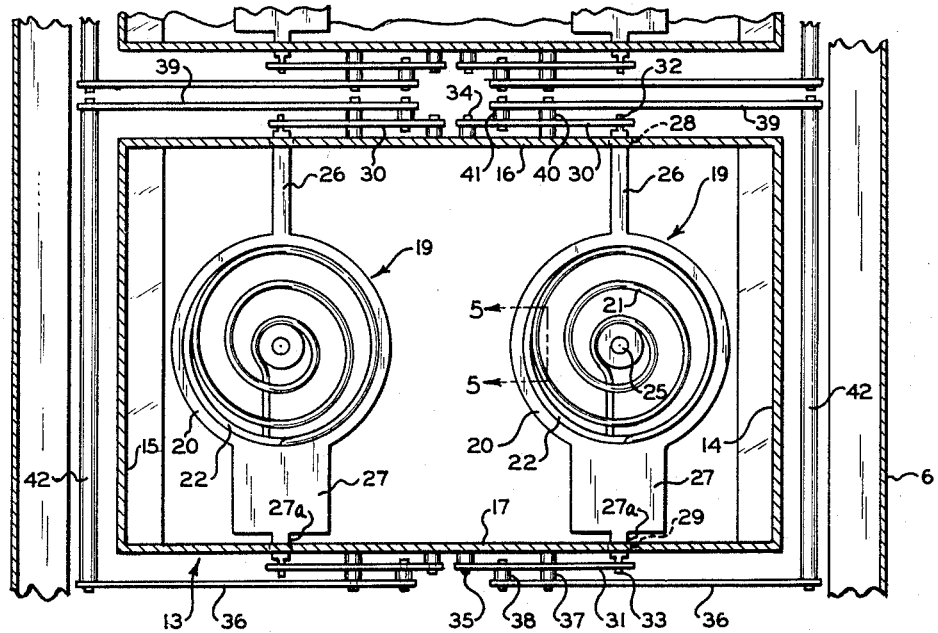
FIG. 4
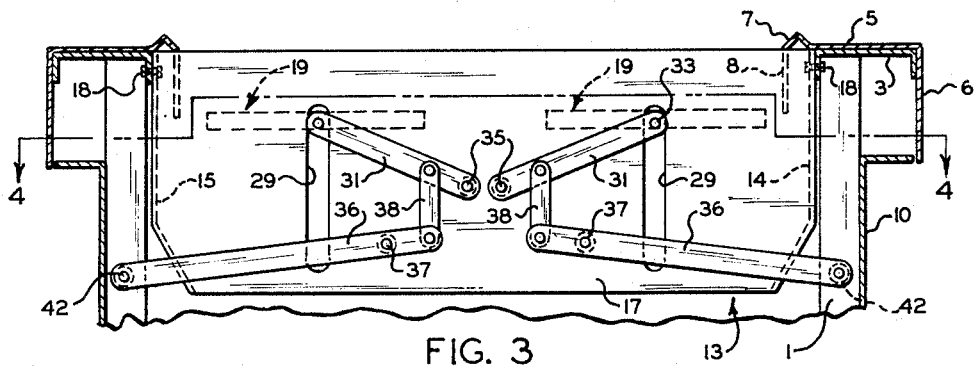
FIG. 3
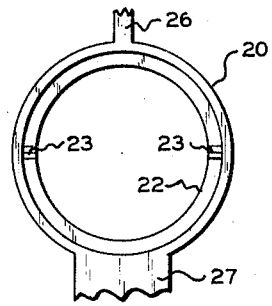
FIG. 6
FIG. 5
*INVENTOR.*
EUGENE C. SWIFT
BY
*Learman, Learman & McCulloch*
ATTORNEYS United States Patent Office 3,162,495
Patented Dec. 22, 1964

3,162,495
TABLE CONSTRUCTION
Eugene C. Swift, Saginaw, Mich., assignor to Saginaw Industries Company, Saginaw, Mich., a corporation of Michigan
Filed June 26, 1961, Ser. No. 119,489
12 Claims. (Cl. 312—223)

This invention relates to a table construction and more particularly to hot or cold food serving tables provided with means for maintaining food at the desired temperature and equipped with apparatus for protecting the food against contamination by the coughing or sneezing of persons passing by the tables.

Tables of the general class to which the invention relates heretofore have been concerned principally with maintaining foods at a given temperature, but such tables have not always conformed to the sanitation requirements deemed necessary by the National Sanitation Foundation, nor have they been constructed in such manner as to facilitate establishing and maintaining sanitary conditions. For example, it is quite common for food to be served from so-called steam tables of the kind having a tank partially filled with water and in which steam pipes are located for the purpose of heating the water which in turn heats the trays partially immersed in the water and containing food. When trays of food are mounted on or removed from the table, it is a fairly common occurrence for some of the foodstuffs to spill out of the tray and fall into the heated water. In order to clean the table effectively, therefore, it is necessary to drain the water tank and thoroughly scrub the interior as well as the steam pipes. An operation of this kind is a time consuming and laborious undertaking and is one which all too often is not done with the thoroughness required.

Other kinds of food serving and food heating units have employed electrical heating devices adapted to engage the lower surface of a food tray, thereby avoiding the problems of water-containing steam tables, but difficulty has been experienced in maintaining the heating unit in reasonably full engagement with the bottom of the tray. Various factors contribute to this undesirable result and among which are rigid mounting of the heating elements and unevenness of the bottom of the tray caused by warping, denting, and other reasons. Unless substantially the full area of the heating element is in engagement with the lower surface of the food tray, a good portion of the heat from the heating element is dissipated to atmosphere, while that portion of the heating element which does engage the tray overheats that particular part of the tray and may cause further warping of the latter as well as uneven heating of the food contained in the tray.

Still another common disadvantage of food serving tables manufactured heretofore is either the total lack of or inadequate or inconvenient devices for protecting food on the table from being contaiminated by the coughing or sneezing of patrons passing by the table. Some tables have no protection at all for the food, whereas others make use of vertical or inclined glass or other material partitions between the food and the patrons. With some of these tables it is necessary for an attendant to hand the food either over or under the partition to the customer, whereas with others of such tables the customers are expected to reach under the partition themselves to select the foods of their choice. In many instances the partitions terminate at their lower ends so close to the top of the table that only a narrow space is provided for a customer's arm and it is not unusual for a customer, when removing food from such a table, either to scrape the food against the lower portion of the partition, drag his sleeve through dishes of food, or both.

An object of this invention is to provide a serving table which overcomes the disadvantages of serving tables of known construction.

Another object of the invention is to provide a serving table which is so constructed as to minimize the creation of unsanitary conditions, but to facilitate cleaning of the table when necessary.

A further object of the invention is to provide a serving table of the character referred to having heat exchange means that automatically are adjustable so as to conform as much as possible to the lower surface of a food containing tray adapted to be assembled with the table.

A further object of the invention is to provide a serving table for food and provided with improved means for protecting food against contamination by a customer's coughing or sneezing and without necessitating the presence of an attendant or making it inconvenient for the customer to serve himself.

Other objects and advantages of the invention will be pointed out specifically or will become apparent from the following description when it is considered in conjunction with the appended claims and the accompanying drawings, in which:

FIGURE 3 is an enlarged, sectional view of a detail of the apparatus shown in FIGURE 2;

FIGURE 4 is a sectional view taken on the line 4—4 of FIGURE 3;

FIGURE 5 is an enlarged, sectional view taken on the line 5—5 of FIGURE 4; and

FIGURE 6 is a top plan view of a portion of the apparatus shown in FIGURE 4.

Figure 1:
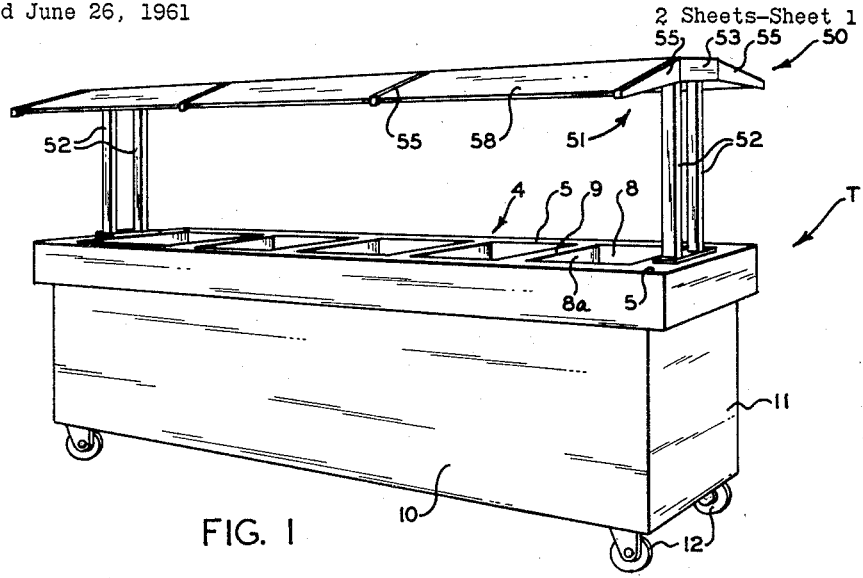
FIGURE 1 is a perspective view of a food serving table constructed in accordance with the invention.

A table constructed in accordance with the invention is designated generally by the reference character T and comprises a plurality of vertical and horizontal frame members 1 and 2, respectively (see FIGURE 2), welded or otherwise suitably secured to one another to form a generally rectangular supporting framework. At the upper ends of the vertical frame members 1 may be fixed in any suitable manner channel members 3 or the like which extend completely around the upper edge of the supporting framework. Atop the channel members 3 is placed a fabricated cover or top structure 4 of stainless steel or the like having a horizontal flange 5 and a depending flange 6 that extend completely around the table. At the inner edge of the horizontal flange 5 is an upstanding rib 7 which terminates in a downwardly extending flange 8. At intervals along the length of the cover structure 4 are cross members 9 provided with downwardly extending flanges 8a that are similar and joined to the flanges 8. The flange 5 defines the top of the table and the flanges 8 and 8a define the edges of a plurality of openings in the table top. The openings are recessed several inches inwardly from the side edges of the table, for a purpose presently to be explained.

The sides of the supporting framework are covered by suitable panels 10 which may be removably supported on the frame members in any conventional manner, and the ends of the supporting framework are covered by suitable similar panels 11. Preferably, the panels 10 at one or both sides of the table are provided with doors which may be opened and closed to permit access to the interior of the framework. Such doors may be of any conventional construction, either sliding or hinged, and accordingly are not considered necessary to illustrate.

A table constructed in accordance with the invention may be either mobile or stationary. If mobile, a plurality of conventional caster wheels 12 may be mounted at the lower part of the framework. If the table is to be stationary, suitable supporting feet (not shown) may be substituted for the casters 12.

Within each opening of the table is supported a hollow mounting shell 13 having opposed end walls 14 and 15 and opposed side walls 16 and 17. The shell is open at both its top and its bottom and its upper end is of such size as to receive within it the flanges 8 and 8a of the table top. The shell 13 is supported on the main frame by bolts or the like 18 which extend through aligned openings formed in the channel members 3 and in the end walls 14 and 15 of the shell. The lower ends of the shell 13 preferably are sloped inwardly and downwardly for a purpose presently to be explained.

The mounting shell 13 is adapted to provide support for one or more heat transfer devices designated generally by the reference charter 19. Each heat transfer element is the same, so only one need be described in detail. Each heat transfer element comprises an electric heating coil 21 of known construction that is supported by a generally circular supporting member 20 of such size as to accommodate the electric heating coil 21. The support 20 includes a recessed, horizontal flange 22 provided with a pair of diametrically opposite fulcrum surfaces 23. The heating coil 21 may be fixed to a metal ring 24 (FIGURE 5) in a conventional manner so as to provide a flat supporting surface adapted to rest upon the fulcrums 23 and permit the heating coil to rock about a substantially horizontal axis. If desired, the heating coil 21 may have associated with it a thermostat 25 of known construction that operates to disconnect the heating coil from its power source when the temperature of the article being heated reaches a predetermined degree.

Extending from opposite sides of the mounting ring 20 is a pair of arms 26 and 27. The arm 27 may be larger than the arm 26 so as to accommodate the wires and connections (not shown) that connect the heating coil to its source of power. Adjacent its free end, however, the arm 27 preferably is provided with a reduced portion 27a which is the same size as the arm 26.

The arms 26 and 27a are of sufficient length to extend through substantially vertical, elongate slots 28 and 29 formed in the side walls 16 and 17, respectively, of the mounting shell. The width of each slot 28 and 29 preferably is substantially greater than the width of the arm extending therethrough, so as to permit the mounting device 20 to rock about a substantially horizontal axis that is normal to the axis of rocking of the heating coil. In order to avoid excessive tilting of the mounting ring 20, the arms 26 and 27a preferably are either square or rectangular in cross-section.

Means is provided for yieldably urging the heat transfer device 19 upwardly and comprises a pair of levers 30 and 31 which are pivotally connected at corresponding ends to cylindrical end portions 32 and 33 formed on the respective arms 26 and 27a. The opposite ends of the levers 30 and 31 are pivoted to posts 34 and 35 that are mounted on the side walls 16 and 17, respectively, of the mounting shell. A lever 36 is pivoted between its ends on a post 37 that also is mounted on the shell wall 17 and one of its ends is pivoted to the lever 31 by means of a link 38. A lever 39 is similarly pivoted between its ends on a post 40 mounted on the shell wall 16 and one of its ends is pivoted to the lever 30 by a link 41. The levers 36 and 39) are of such length that their other ends extend beyond the end wall 14 of the shell and are connected to one another by a weighted cross bar 42. The construction and arrangement of the linkage and parts just described are such that the weight 42 slightly overbalances the weight of the heat transfer device 19 and exerts a constant but yieldable force on the latter tending to elevate it to the upper limts of the slots 28 and 29.

One or more food trays 43 (see FIGURE 2) may be inserted within each shell 13. Each tray includes a bottom 44 and upstanding side walls 45 terminating at their upper edges in outwardly rolled flanges 46 which engage the upstanding ribs 7 formed on the table top. Some of the trays are deeper than others, so the length of the slots 28 and 29 formed in the shells should be such as to assure engagement between the heat transfer devices 19 and the bottom of the shallowest tray. Moreover, the counterbalancing of the heat transfer devices should be such as to permit the smallest and shallowest tray adapted for use with the apparatus to be capable of displacing the heat transfer devices downwardly even when the tray is empty, thereby preventing the biasing apparatus from causing the trays to be pushed upwardly as they are emptied. In this connection, the use of weights and linkages has an advantage over the use of springs inasmuch as the biasing force exerted by the weight on the heat transfer devices always will be constant, whereas the forces exerted by springs vary according to the extent to which they are compressed or stretched.

Figure 2:
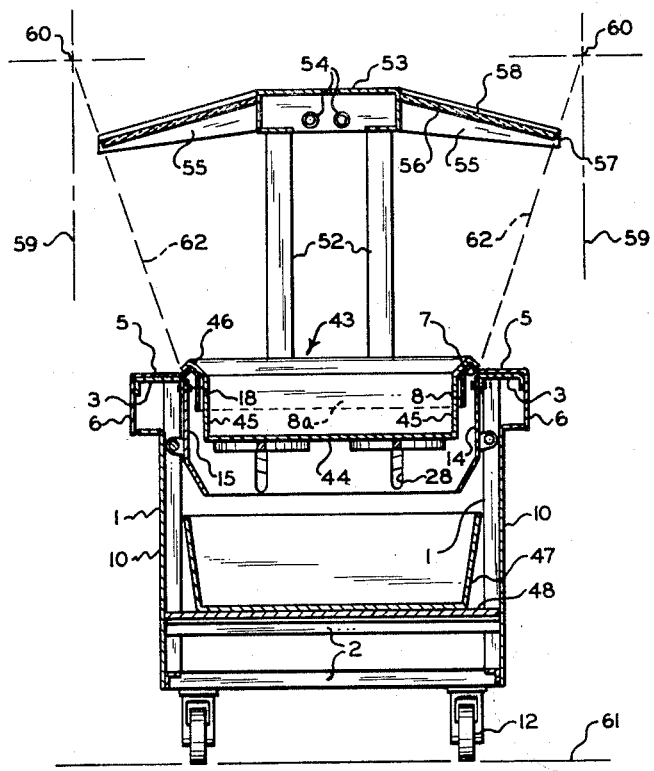
FIGURE 2 is a transverse sectional view of the table.

The tray 43 disclosed in FIGURE 2 is large enough to fill one of the openings in the table top and thus its bottom 44 engages both of the heat transfer devices. The tray-receiving opening could accommodate two somewhat smaller trays, however, so that each tray would be in engagement with only one heat transfer device. In either case, each heat transfer device is independently mounted for universal movement relative to the supporting frame and consequently is capable of adjusting its position, within limits, to conform as much as possible to the contour of the tray bottom. Thus, if the bottom of the tray should be somewhat warped or concave, for example, each heat transfer device will be capable of adjustment so as to permit the greatest surface area of its heating coil to engage the bottom of the tray.

In the event some of the food in a tray should inadvertently be spilled during insertion or removal of the tray from the table opening, it will fall through the hollow shell and be directed by the inclined edges of the latter into a refuse receptacle 47 that may be supported beneath the shell on a rack 48. The open bottom construction of the shell thus avoids the accumulation of spilled food in the upper level of the table where the food is to be served. Moreover, the open construction of the shell and the overlapping of the latter by the flanges 8 and 8a not only prevent the accumulation of spilled food in the shell, but also facilitate cleaning of the latter.

It is not sufficient to protect food against contamination from foreign matter located adjacent the food itself. In public establishments such as restaurants and cafeterias where the patrons or customers select their food from a serving table, care must be taken to prevent contamination of the food by the coughing or sneezing of customers. Accordingly, apparatus constructed in accordance with the invention includes shield means designated generally by the reference character 50 for preventing the contamination of food in this manner.

The shield means comprises a supporting superstructure 51 including upright pillars 52 at opposite ends of the table that extend through openings in the top 5 and are fixed in any suitable manner to the supporting framework. At their upper ends, the pillars 52 are secured to a longitudinally extending housing 53 within which neon or other lamps 54 may be mounted. Extending laterally from opposite sides of the housing 53 is a plurality of supporting arms 55, each of which is provided with a bracket 56 having an upturned end 57 on which impervious, transparent glass panels 58 may be removably mounted. The removability of the panels 58 facilitates cleaning of them and of their supporting structure.

The National Sanitation Foundation has found that the average distance of an adult's mouth above floor level is between 58 and 62 inches and that the distance of such a customer's mouth from one side of a serving table is about 6 inches. These dimensions have been kept in mind in the designing of the instant table. Thus, the vertical lines 59 shown in FIGURE 2 are located about 6 inches away from the table top flanges 6 and the points 60 are located 58 inches above the level of the floor 61 on which the table is supported. To allow a factor of safety, the tray-accommodating openings in the table are recessed inwardly about 3 inches so that the edges of the tray will be about 9 inches from the adjacent lines 59. The length of the glass panel supporting arms 55 and the width of the glass panels 58 are such that a straight line drawn from the edge of the tray to the point 60 will touch the side edge of the glass panel 58. Such a straight line is shown in FIGURE 2 by the reference character 62. A table constructed in accordance with the foregoing disclosure will locate the shielding panels 58 in a position between the customer's mouth and the food so as to safeguard the food against contamination should the customer sneeze or cough.

The construction and arrangement of the shield device 50 are such that the lower edge of the shielding panels is about 18 inches above the level of the table top, thereby providing ample clearance to permit removal of food from the tray 43, either by the customer himself or by an attendant, and without risking contamination of the food by a person's clothing.

The disclosed embodiment is representative of a presently preferred form of the invention, but is intended to be illustrative rather than definitive thereof. The invention is defined in the claims.

I claim:

1. A table construction comprising supporting frame means; means supported on said frame means and forming a table top having at least one opening therein; heat transfer means positioned in said opening; means mounting said heat transfer means on said frame means for universal movements relative to said frame means; linkage means operatively connected to said heat transfer means; and overbalancing means connected to said linkage means and constantly but yieldably urging said heat transfer means upwardly.

2. A table construction comprising supporting frame means; means supported on said frame means and forming a table top having at least one opening therein; heat transfer means positioned in said opening; means mounting said heat transfer means on said frame means for rocking movements relative to said frame means about two substantially horizontal axes substantially normal to one another, said mounting means also mounting said heat transfer means for vertical movements; overbalancing means and linkage means interconnecting said overbalancing means and said heat transfer means, said overbalancing means urging said heat transfer means upwardly under a constant force.

3. A table construction comprising supporting frame means; means supported on said frame means and forming a table top having at least one opening therein; a hollow mounting shell having an open top; means mounting said shell on said frame means with its open top in substantial alignment with the opening in said table top; heat transfer means; means mounting said heat transfer means within said shell for universal movements relative thereto; linkage means operatively connected to said heat transfer means; and overbalancing means connected to said linkage means and yieldably urging said heat transfer means upwardly.

4. A table construction comprising supporting frame means; means supported on said frame means and forming a table top having at least one opening therein; a hollow mounting shell having an open top; means mounting said shell on said frame means with its open top in substantial alignment with the opening in said table top; heat transfer means; means mounting said heat transfer means within said shell for rocking movements about two substantially horizontal axes that are substantially normal to one another, and for vertical movements relative to said shell; overbalancing means and linkage means interconnecting said overbalancing means and said heat transfer means and yieldably urging the latter upwardly under a constant force.

5. A table construction comprising supporting frame means; means supported on said frame means and forming a table top having at least one opening therein spaced inwardly from the edges of said top, said opening being defined by downwardly turned flanges on said top forming means; a hollow mounting shell having an open top; means mounting said shell on said frame means with said flanges received in said shell; heat transfer means; means mounting said transfer means within said shell for rocking movements about two substantially horizontal axes that are substantially normal to one another, and for vertical movements relative to said shell, said shell having an elongated, vertically extending slot formed in each of two opposed walls and through which said mounting means extends, each of said slots being substantially wider than the width of the mounting means extending therethrough; and constant force exerting means connected to the mounting means for said transfer means and yieldably urging the latter upwardly at a constant force.

6. The construction set forth in claim 5 wherein the means for yieldably urging said heat transfer means upwardly comprises a lever pivoted intermediate its ends on each of said opposed end walls; means connecting one end of said lever to the associated end of said mounting means; and means connecting the other end of said lever to a weight.

7. The construction set forth in claim 5 wherein said heat transfer means comprises a substantially flat electrical heating coil, and wherein said mounting means comprises a support member having fulcrum surfaces on which said coil is supported.

8. A table construction comprising supporting frame means adapted to rest upon a floor; means supported on said frame means and forming a table top having at least one opening therein spaced inwardly from the outer edges of said table, said opening being of such size as to receive a tray therein; heat transfer means positioned in said opening for engagement by a tray received therein; a superstructure supported by said frame means above the latter and extending substantially the full length of said table top; and shield means supported by said superstructure and extending beyond the side edges of said table top, said frame means and said supporting structure together being of such height that a straight line extending from a side edge of said opening and touching a side edge of said shield means will intersect a vertical line approximately six inches to one side of said table top at a point between fifty-eight and sixty-two inches above said floor.

9. The construction set forth in claim 8 wherein said shield means comprises impervious panels removably supported on said superstructure.

10. The construction set forth in claim 9 wherein said panels are formed of transparent glass.

11. The construction set forth in claim 8 including means mounting said heat transfer means on said frame means for universal movement relative to said frame means.

12. The construction set forth in claim 11 including means operatively connected to said heat transfer means for yieldably urging the latter upwardly.

References Cited in the file of this patent

UNITED STATES PATENTS

| | | |
|---|---|---|
| 1,384,530 | Knauft | July 12, 1921 |
| 2,709,215 | Miller | May 24, 1955 |
| 2,734,988 | Beardslee | Feb. 14, 1956 |
| 2,772,341 | Lewis | Nov. 27, 1956 |
| 2,847,552 | Gates | Aug. 12, 1958 |
| 2,874,261 | Wolf | Feb. 17, 1959 |
| 2,894,604 | McMillan | July 14, 1959 |